US008254370B2

(12) United States Patent
Ye et al.

(10) Patent No.: US 8,254,370 B2
(45) Date of Patent: Aug. 28, 2012

(54) METHOD FOR REDIRECTING NETWORK COMMUNICATION PORTS AND NETWORK COMMUNICATION SYSTEM THEREOF

(75) Inventors: Maolin Ye, Shenzhen (CN); Jianhong Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 186 days.

(21) Appl. No.: 12/428,050

(22) Filed: Apr. 22, 2009

(65) Prior Publication Data

US 2009/0201802 A1    Aug. 13, 2009

Related U.S. Application Data

(63) Continuation of application No. PCT/CN2007/003029, filed on Oct. 23, 2007.

(30) Foreign Application Priority Data

Oct. 23, 2006   (CN) .......................... 2006 1 0149709

(51) Int. Cl.
   *H04L 12/28* (2006.01)
(52) U.S. Cl. ...................................... 370/351
(58) Field of Classification Search .......... 370/229–231, 370/241–254, 351–352
   See application file for complete search history.

(56) References Cited

U.S. PATENT DOCUMENTS

| | | | | |
|---|---|---|---|---|
| 5,941,954 | A * | 8/1999 | Kalajan ........................ | 709/239 |
| 6,151,495 | A | 11/2000 | Rune | |
| 6,654,366 | B1 * | 11/2003 | Ketcham ...................... | 370/352 |
| 7,002,989 | B2 * | 2/2006 | Agrawal et al. .............. | 370/467 |
| 7,162,540 | B2 * | 1/2007 | Jasen et al. .................... | 709/242 |
| 7,408,926 | B1 * | 8/2008 | Moeck et al. ................. | 370/352 |
| 2002/0120782 | A1 * | 8/2002 | Dillon et al. ................... | 709/246 |
| 2002/0162024 | A1 * | 10/2002 | Cunchon et al. .............. | 713/201 |
| 2003/0013467 | A1 * | 1/2003 | Caloud ......................... | 455/466 |
| 2003/0018912 | A1 | 1/2003 | Boyle et al. | |
| 2003/0074453 | A1 * | 4/2003 | Ikonen ......................... | 709/228 |
| 2003/0110379 | A1 * | 6/2003 | Ylonen et al. ................. | 713/164 |
| 2003/0185197 | A1 * | 10/2003 | Banerjee et al. .............. | 370/351 |
| 2004/0064584 | A1 * | 4/2004 | Mitchell et al. ............... | 709/245 |

(Continued)

FOREIGN PATENT DOCUMENTS

CN   1843004 A   10/2004

(Continued)

OTHER PUBLICATIONS

Chinese Office Action issued in corresponding Chinese Patent Application No. 2006 10149709.3; issued May 30, 2008.

(Continued)

*Primary Examiner* — Andrew Lai
*Assistant Examiner* — Juvena Loo
(74) *Attorney, Agent, or Firm* — Brinks Hofer Gilson & Lione (57) ABSTRACT

A method for redirecting network communication port and a network communication system thereof are disclosed. When a receiving end determines that a communication port needs to be redirected, the receiving end sends a redirected address to a transmitting end via a communication port. The redirected address includes redirected address information of a transport layer. According to the present invention, when the gatekeeper is not able to receive, via a well-known port, some of signaling sent from a node, the gatekeeper can inform the transmitting end to switch the port automatically, allowing thereby the node to continue the previous service. The present invention further allows the node to perform protocol switching automatically.

12 Claims, 3 Drawing Sheets

U.S. PATENT DOCUMENTS

| | | | |
|---|---|---|---|
| 2004/0158606 A1* | 8/2004 | Tsai | 709/203 |
| 2005/0055434 A1* | 3/2005 | Burrows et al. | 709/224 |
| 2006/0031472 A1* | 2/2006 | Rajavelu et al. | 709/224 |
| 2006/0031518 A1 | 2/2006 | Jennings | |
| 2006/0045098 A1* | 3/2006 | Krause | 370/396 |
| 2006/0209794 A1 | 9/2006 | Bae et al. | |
| 2007/0121490 A1* | 5/2007 | Iwakawa et al. | 370/218 |
| 2007/0223446 A1* | 9/2007 | McMenamy et al. | 370/351 |

FOREIGN PATENT DOCUMENTS

| | | |
|---|---|---|
| CN | 1545244 A | 11/2004 |
| CN | 1694453 | 11/2005 |
| CN | 1713590 | 12/2005 |
| CN | 1929450 | 3/2007 |
| CN | 100514940 C | 7/2009 |

OTHER PUBLICATIONS

Written Opinion issued in corresponding PCT Application No. PCT/CN2007/003029; mailed Jan. 31, 2008.

"Draft Revised Recommendation H.323 V5 (for Consent)" International Telecommunication Union—Telecommunication Standardization Sector. May 20-30, 2003.

"Draft Revised ITU-T. Rec. H.225.0 Version 6 'Call Signalling Protocols and Media Stream Packetization for Packet-based Multimedia Communication Systems'" International Telecommunication Union—Telecommunication Standardization Sector. Apr. 3-13, 2006.

Rosenburg, J. et al. "SIP Session Initiation Protocol" The Internet Society Jun. 2002.

* cited by examiner

METHOD FOR REDIRECTING NETWORK COMMUNICATION PORTS AND NETWORK COMMUNICATION SYSTEM THEREOF

CROSS-REFERENCE TO RELATED APPLICATIONS

This application is a continuation of International Application No. PCT/CN2007/003029, filed Oct. 23, 2007, which claims the benefit of Chinese Patent Application No. 200610149709.3, filed Oct. 23, 2006, both of which are hereby incorporated by reference in their entireties.

FIELD OF THE INVENTION

The present invention relates to communication field, and more specifically, to port redirection technique.

BACKGROUND

H.323 protocols (a proposal on packet multimedia communication system by ITU) proposed by International Telecommunications Union (ITU) are popular multimedia communication standard at present. A H.323 protocol based communication system includes two components, i.e., a gatekeeper and an endpoint. The gatekeeper is an administrator of the entire H.323 communication system, in charge of zone management, access control, address translation, broadband management, etc. The endpoint includes a node, a gateway, a Multipoint Control Unit (MCU), etc. Both an H.323 registration process and a calling process require Registration, Admission and Status signaling (RAS signaling for communication between the gatekeeper and the node specified by H.323 protocol) interaction with the gatekeeper.

In order to ensure a secure communication for the users, the H.323 communication system is provided with lots of network devices, such as gateways/firewalls, for checking network packets passing through the network devices, especially, the network packets passing through well-known ports. In practice, it often occurs that some of the signaling passing through the well-known ports is filtered, which disables the users from communicating with networks normally. To address this issue, a current solution is manual adjustment, which is to modify some of the filtering criteria configured for the firewall so that some of the signaling can pass though the well-known port. Another solution is to open a relatively convert port, i.e., an unknown port, in the firewall and then manually inform all the original users communicating with the gatekeeper via the well-known port, which means that multiple users switch to another port to communicate with the gatekeeper.

The approach of manually modifying the filtering criteria in the firewall may incur a potential security issue for the communication, whereas the approach of opening an unknown port in the firewall for subsequent communications is more applicable to a small number of users considering the fact that a registered port is open to a group of users. In the case of a large number of users, if the above described notification manner is still employed the workload of maintenance and the cost will be remarkable.

In addition, as Session Initiated Protocol (SIP), another multimedia communication standard, plays a more and more important role in multimedia communication, lots of manufacturers invest to develop products which can support both H. 323 protocol and SIP, such as node and gatekeeper. The node can not only register with an SIP proxy server, but also with a H.323 gatekeeper. In practice, some nodes need to be directed to an SIP proxy server or gatekeeper in a certain area. In this case, the direction task primarily falls on a manual switching of the protocol. In other words, supported protocols are configured at the node and it is through a manual notification to inform the node whether to register with the SIP based proxy server or to register with the H.323 based gatekeeper before the node is registered. However, when the node has registered with the SIP proxy server already, but somehow needs to switch to the H.323 gatekeeper, or when the node has registered with H.323 gatekeeper already, but somehow needs to switch to the SIP proxy server, the above described manual switching of the protocol becomes slow and inflexible.

SUMMARY

A method for redirecting a network communication port and a network communication system thereof are provided according to the present invention. When the gatekeeper is not able to receive, via a well-known port, some of signaling sent from a node, the gatekeeper can inform the transmitting side to switch the port automatically, allowing thereby the node to continue a previous service. In addition, the present invention further allows the node to perform protocol switching automatically.

The present invention can be implemented according to the below technical solutions.

The method for redirecting a network communication port according to one embodiment of the present invention includes:

determining, by a receiving end, that a communication port needs to be redirected; and sending a redirected address to a transmitting end via a port which is currently in communication with the transmitting end, wherein the redirected address includes redirected address information of a transport layer.

A network communication system according to one embodiment of the present invention includes:

a receiving end, configured to send, when it is determined that a communication port needs to be redirected, a redirected address to a transmitting end via a port which is currently in communication with a transmitting end, wherein the redirected address includes address information of a redirected port; and a transmitting end, configured to check the redirected address and switch to a redirected port corresponding to the redirected address information of the transport layer after the transmitting end detects the address information of the redirected port, and communicate with a reachable receiving end via the redirected port.

A receiving end according to one embodiment of the present invention includes:

a redirection determination unit, configured to determine whether or not to redirect a certain communication port; and a transmission unit, configured to send a redirected address to a transmitting end via a port which is currently in communication with the transmitting end when the redirection determination unit determines that the certain communication port needs to be redirected, wherein the redirected address comprises address information of transport layer for redirection.

A transmitting end according to one embodiment of the present invention includes:

a redirection unit, configured to acquire a redirected address sent from a receiving end, check the redirected address and switch to a communication port corresponding to address information of a transport layer after the redirection unit detects the address information of the transport layer for redirection; and an information transmission unit, configured to communicate with a reachable receiving end via the communication port that the redirection unit switches to.

As can be seen from the embodiments of the present invention, when a receiving end determines that a communication port needs to be redirected, the receiving end sends a redirected address to a transmitting side via a port currently in communication with the transmitting side. Therefore, when the gatekeeper is not able to receive, via a well-known port, some of the signaling sent from a node, the gatekeeper is able to inform the node to perform an automatic port switching operation so that the node may continue the previous service via other unknown port. Accordingly, the problem that the node is not able to conduct communication normally as some of the signaling of the well-known port is filtered when passing through a firewall or other network security devices is solved. Thus, manual configuration is no longer necessary and the problems of the security issue, heavy workload for maintenance, high cost incurred due to the manual configuration are eliminated. Moreover, embodiments of the present invention may also allow the node to perform an automatic switching of protocol so that the node is able to communicate in a network with different protocol. In addition, the protocol switching is relatively flexible with high efficiency.

DETAILED DESCRIPTION

During the application of H.323 protocol, when a gatekeeper discovers that it can not receive, at a well-known port, some of the signaling transmitted from a node, which means that the gatekeeper discovers that some of the signaling transmitted from the node to the gatekeeper is filtered by the network device such as firewall, the gatekeeper may realize a redirection process according to one embodiment of the present invention. The node may redirect to the gatekeeper through an unknown port so that the original service can be continued. Further, the embodiment of the present invention may allow a node which supports multiple protocols may conduct communication in networks supporting different protocols.

Figure 1:
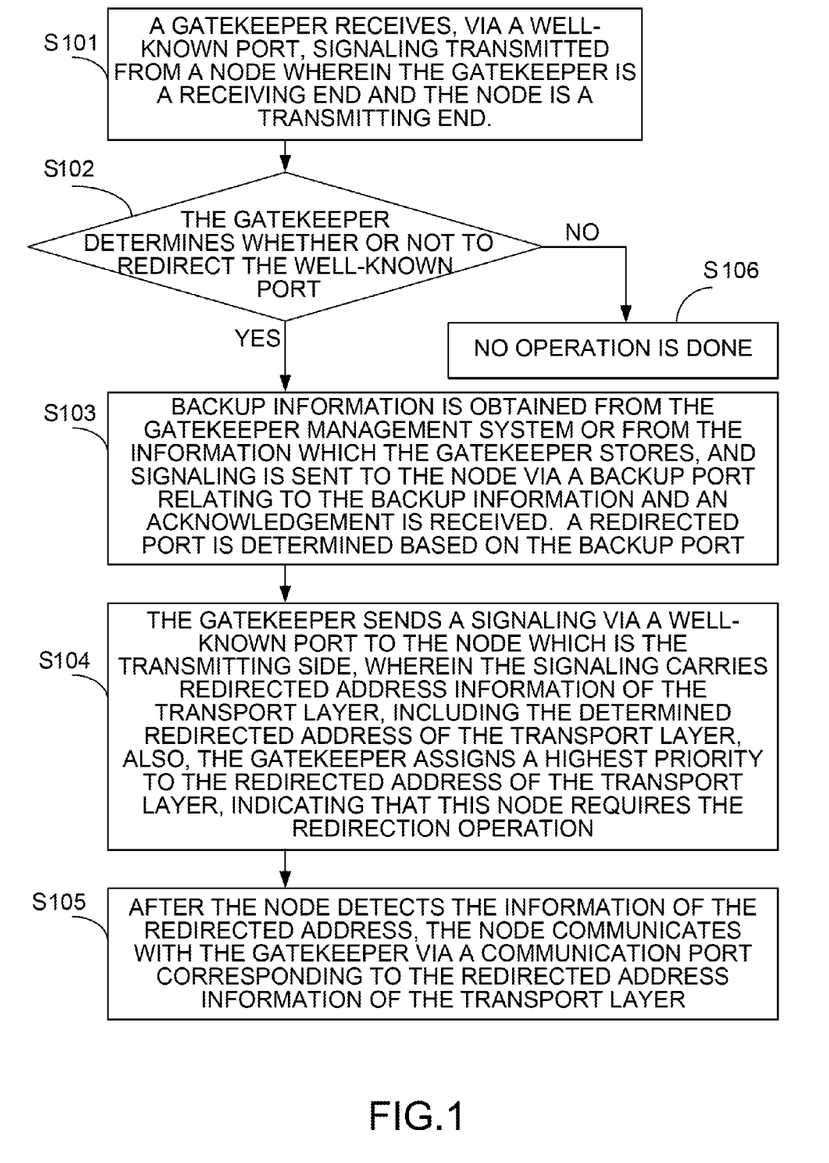
FIG. 1 illustrates a flowchart according to a first embodiment of the present invention.

A method for redirecting network communication ports is provided according to a first embodiment of the present invention. When the gatekeeper, as a receiving end, discovers that it cannot receive, at a well-known port, some of the signaling transmitted from a node which serves as a transmitting end, the gatekeeper may send a redirected address to the node. The node may re-register with the gatekeeper based on the redirected address. Before implementing the first embodiment, backup information should be provisioned in the gatekeeper management system based on networking or service policy. The information includes matching condition for enabling the backup, backup address information of a transport layer (e.g., port number) and address information of the network layer of the gatekeeper, etc. The backup address information of the transport layer may be stored in the gatekeeper, or stored in a gatekeeper management system. An implementation of the embodiment, as illustrated in FIG. 1, includes the following steps.

At step S101, a gatekeeper receives, via a well-known port, signaling, such as Registration Request (RRQ) signaling transmitted from a node, wherein the gatekeeper is a receiving end and the node is a transmitting end.

At step S102, the gatekeeper monitors the received signaling and determines whether or not to redirect the well-known port according to the received signaling. When the gatekeeper discovers that an error occurs on certain information of the node, or certain information can not be reached, then it is determined that the well-known port needs to be redirected and then step S103 is performed; otherwise, step S106 is performed, that is, no operation is performed and the node continues to send signaling to the gatekeeper via the original well-known port.

At step S103, backup address information of the transport layer is obtained from the gatekeeper management system or the information which the gatekeeper stores. Also, signaling is sent to the node via a communication port relating to the backup address information of the transport layer and an acknowledgement is received. An available redirected port is determined based on the communication port relating to the backup address information of the transport layer. The address information of the transport layer corresponding to the available backup communication port can be used as the redirected address information of the transport layer.

When the gatekeeper determines an available backup port based on the backup address information of the transport layer, the gatekeeper selects one address among a specified range of address information of the backup transfer layer (e.g., 1700-1900 communication port numbers) and sends a Non-Standard Message (NSM) signaling via a communication port relating to the selected backup address information of the transport layer to the node and wait for an acknowledgement from the node. If the gatekeeper receives the acknowledgement, it means that the communication port relating to the backup address information of the transport layer is allowed to pass the firewall and can be regarded as an available backup communication port; otherwise, the gatekeeper checks on a next communication port. An automatic detection operation on communication ports is repeated until an available backup communication port is found as a redirected port.

At step S104, the gatekeeper sends a signaling, e.g., a Registration Reject (RRJ) signaling, to the node via a well-known port, wherein the signaling carries redirected address information (e.g., a port number) of the transport layer. Also, the gatekeeper assigns a highest priority to the redirected address of the transport layer, indicating that this node requires the redirection operation.

At step S104, the gatekeeper adds a re-registration token into the RRJ signaling to be transmitted in order to indicate that this node requires the redirection operation.

At step S104, address information of the network layer of the gatekeeper, i.e., IP address information, may also be carried in the RRJ signaling to be transmitted to the node.

At step S104, it is also possible not to assign priority to the address of the redirected port. However, the transmitting end may take up some time which is used in detecting the address of the redirected port.

At step S105, after the node detects the information of the redirected address, the node communicates with the gatekeeper via a communication port corresponding to the redirected address information of the transport layer.

A method for redirecting network communication ports is provided according to a second embodiment of the present invention. When the gatekeeper, as a receiving end, discovers that it cannot receive, at a well-known port, some of the signaling transmitted from a node which serves as a transmitting end, the gatekeeper may send a redirected address to the node. The node may re-register with a backup gatekeeper according to the redirected address. Also, the backup gatekeeper is required to have the same capability for managing the node as that of the original gatekeeper. Before implementing the second embodiment, the backup information should be provisioned in the gatekeeper management system based on the networking or service policy. The information includes matching condition for enabling the backup gatekeeper, backup address information of the transport layer (e.g., port number) and the address of the network layer of the backup gatekeeper, etc. The backup information may be stored in the gatekeeper, or stored in the gatekeeper management system. The implementation of the second embodiment is described below.

A gatekeeper receives a signaling, such as RRQ signaling, from a node, wherein the gatekeeper is a receiving end and the node is a transmitting end.

The gatekeeper monitors the received signaling. When the gatekeeper discovers that an error occurs on certain information, the gatekeeper determines whether or not to redirect the port and the gatekeeper based on the configuration issued by the gatekeeper management system. If redirection is not required, on operation is performed and the node continues to send signaling to the gatekeeper via the original well-known port.

If port redirection and gatekeeper redirection are required, the backup information is to be obtained from the gatekeeper management system or the gatekeeper, and the available backup port and the available backup gatekeeper is to be determined based on the backup information. That is, one or more backup gatekeepers having the capability of managing the node are specified and one or more backup addresses of the transport layers reaching the address of the network layer of the backup gatekeepers are designated as the redirected address of the transport layer. And, the communication port corresponding to the redirected address of the transport layer serves as the redirected port.

Then, the gatekeeper sends a signaling, e.g., an RRJ signaling, to the node via a well-known port, wherein the signaling carries address information of the transport layer corresponding to the determined redirected port and the address information of the network layer corresponding to the backup gatekeeper. Also, the gatekeeper indicates that this node requires the port redirection operation by using a re-registration token.

The node selects one piece of information from the received redirected address information of the transport layer and sends a signaling to the backup gatekeeper via a communication port corresponding to the selected redirected address of the transport layer.

Figure 2:
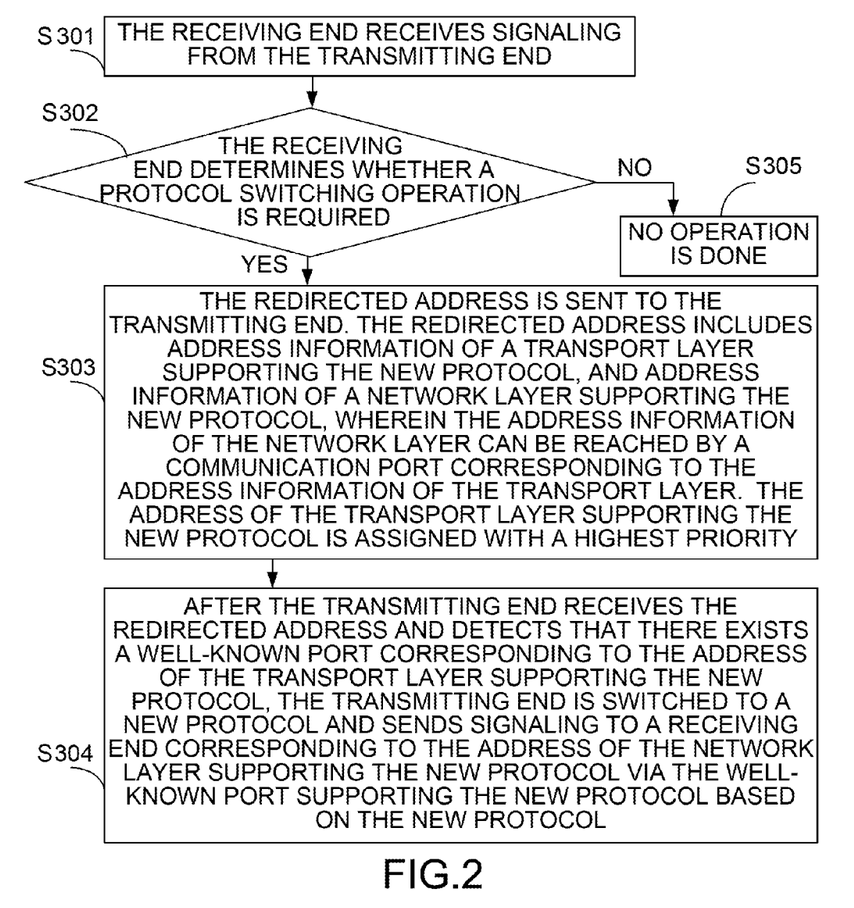
FIG. 2 illustrates a flowchart according to a third embodiment of the present invention.

A method for redirecting network communication port is provided according to a third embodiment of the present invention. When the receiving end determines that it needs to perform redirection operation on the communication port, the receiving end sends the redirected address to the transmitting end. The redirected address carries address information of the transport layer which supports the new protocol, such as address information of well-known port, and address information of the network layer of the receiving end which supports the new protocol. Once the transmitting end detects that the address information (e.g., a well-known port number) of the transport layer relating to the new protocol is in the redirected address, protocol switching operation is performed. An implementation of the embodiment, as illustrated in FIG. 2, includes the following steps.

At step S301, the receiving end receives signaling from the transmitting end.

At step S302, after receiving the signaling from the transmitting end, the receiving end detects that the signaling is based on a particular protocol and determines on the basis of a service policy that the a protocol switching operation is required, the receiving end then determines that the communication port needs to be redirected and step S303 is performed. If the receiving end determines that no redirection operation is required, step S305 is performed, i.e., no operation is performed.

At step S303, the redirected address is sent to the transmitting end. The redirected address includes address information of a transport layer supporting the new protocol, and address information of a network layer supporting the new protocol, wherein the address information of the network layer can be reached by a communication port corresponding to the address information of the transport layer. The address of the transport layer supporting the new protocol is assigned with a highest priority.

At step S304, after the transmitting end receives the redirected address and detects that there exists a well-known port corresponding to the address of the transport layer supporting the new protocol, the transmitting end switches to a new protocol and sends signaling to a receiving end corresponding to the address of the network layer supporting the new protocol via a communication port corresponding to the address information of the transport layer based on the new protocol.

Figure 3:
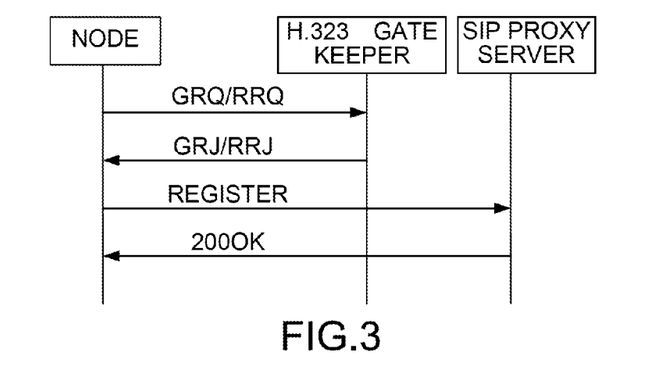
FIG. 3 illustrates a flowchart of a transmitting end switching from H.323 protocol to SIP according to the third embodiment of the present invention.

FIG. 3 illustrates a protocol switching from H.323 protocol to SIP as an example of a third embodiment of the present invention.

A node which serves as a transmitting end sends a Gatekeeper Request (GRQ)/RRQ signaling to a gatekeeper that serves as a receiving end, wherein the GRQ/RRQ carries IP address information of the gatekeeper and a registered port number 1719.

When the gatekeeper receives the GRQ/RRQ signaling sent from the node, and detects that the signaling is based on H.323 protocol, and determines on the basis of the service policy issued by the gatekeeper management station that a switching operation from H.323 protocol to SIP is required, the gatekeeper determines that the communication port needs to be redirected such that the node may transmit signaling to an SIP proxy server. Then, the gatekeeper sends a Gatekeeper Reject (GRJ)/RRJ signaling to the node and adds the address of the SIP proxy server to the backup gatekeeper list in the GRJ/RRJ signaling. The address of the SIP proxy server includes an IP address of the SIP proxy server and a well-known port number of the SIP, such as 5060 port, and assigns a highest priority to the address.

When the node receives the GRJ/RRJ signaling from the gatekeeper, the node acquires from the signaling the well-known port number 5060 supporting the SIP. Then, the node switches its protocol to SIP and sends a REGISTER (re-register) signaling to the SIP proxy server for registration via the well-known port 5060.

After the SIP proxy server confirms that the registration is successful, it returns 200 OK to the node. From then on, the signaling sent from the node are all SIP signaling.

Figure 4:
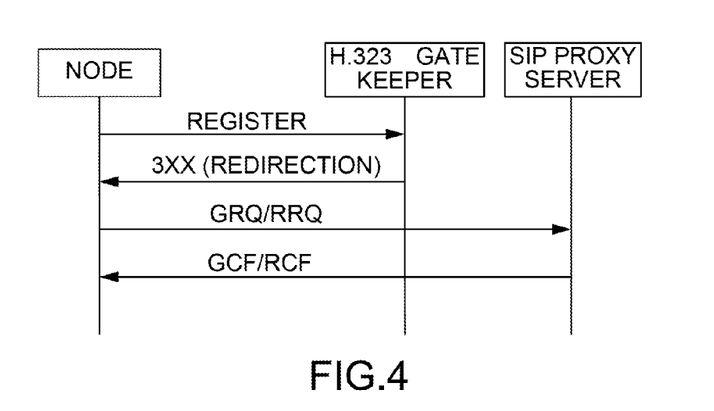
FIG. 4 illustrates a flowchart of a transmitting end switching from SIP to H.323 protocol according to the third embodiment of the present invention.

FIG. 4 illustrates a switching operation from SIP to H.323 protocol as an example of a third embodiment of the present invention.

A node which serves as a transmitting end sends a REGISTER signaling to an SIP proxy server which serves as a receiving end.

When the SIP proxy server receives the REGISTER signaling from the node and detects that the signaling is based on SIP protocol and determines, based on a redirection service policy it stores, that a switching operation from SIP protocol to H.323 protocol is required, the SIP proxy server determines that the communication port needs to be redirected. Then, the SIP proxy server sends a 3xx acknowledgement signaling to the node and adds the information of the redirected address in the acknowledgement signaling (the information of the redirected address can be populated in the Contact header of the acknowledgement signaling). The information of the redirected address may include address information of the network layer of the gatekeeper supporting H.323 protocol and the address information of the transport layer supporting the H.323 protocol, such as port number 1719. The address of the transport layer supporting the H.323 protocol can be assigned with a highest priority.

After the node receives the acknowledgement signaling and detects the well-known port 1719 supporting the H.323 protocol, the node then switches to the H.323 protocol and sends GRQ/RRQ signaling, via the well-known port 1719 supporting the H.323 protocol, to the address of the network layer of the gatekeeper supporting the H.323 protocol.

After the gatekeeper supporting the H.323 protocol receives the H.323 based GRQ/RRQ signaling from the node, the gatekeeper returns an acknowledgement signaling. From then on, the signaling sent from the node are all H.323 protocol signaling.

Signaling interaction is illustrated as an example of the foregoing embodiment of the present invention. However, the present invention is not intended to be limiting in this regard. Embodiments of the present invention may also be applied to data interaction between two communication parties.

Figure 5:
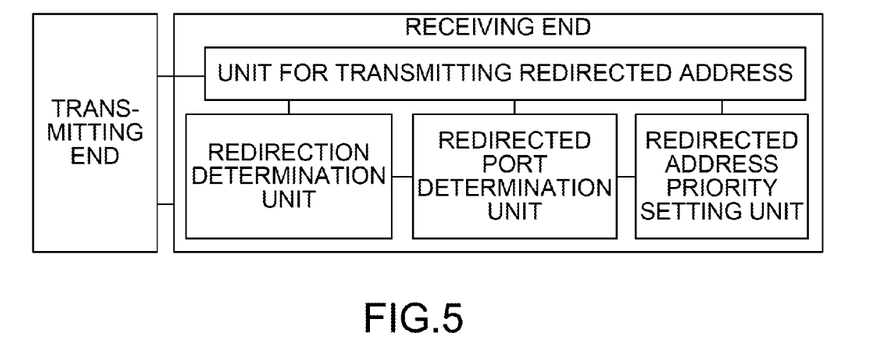
FIG. 5 illustrates a block diagram according to a fourth embodiment of the present invention.

A network communication system is provided according to a fourth embodiment of the present invention. The system corresponds to the first embodiment and the second embodiment. The structure of the system is illustrated in FIG. 5. The system includes a transmitting end and a receiving end. The receiving end includes a redirection determination unit and a unit for transmitting redirected address. When there is more than one backup port, the receiving end may further include a redirected port determination unit. Moreover, in order for the transmitting end to detect the redirected address as soon as possible, the receiving end may further include a redirected address priority setting unit.

The signal flow among each element in the system is described below.

The redirection determination unit of the receiving end is operable for detecting information (signaling or data information) from the transmitting end, wherein the information is received by the receiving end via a port. When the redirection determination unit detects that certain information can not be reached, it is determined that the communication port needs to be redirected. The determination result is then sent to the redirected port determination unit and the unit for transmitting redirected address.

The redirected port determination unit is operable for acquiring backup address information of the transport layer from the management system or from the information that the receiving end stores. The address information is then sent to the transmitting end via a backup port corresponding to the backup address information of the transport layer. After receiving an acknowledgement from the transmitting end, the redirected port determination unit may determine that the backup port in use is a redirected port (the method for determining the redirected port is similar to the method described in the first embodiment, which is omitted herein for brevity). Then, the redirected port determination unit sends the redirected address information of the transport layer to the redirected address priority setting unit and the unit for transmitting redirected address. Alternatively, the redirected port determination unit is operable for directly specifying one or more backup receiving end having capability for managing the transmitting end and specifying one or more backup ports reaching the backup receiving end as the redirected ports. Then, the redirected port determination unit sends address information of the network layer of the backup receiving end and the address information of the transport layer of the redirected port which is able to reach the backup receiving end to the redirected address priority setting unit and the unit for transmitting redirected address.

The redirected address priority setting unit is operable for assigning a highest priority to the redirected address of the transport layer and sending the priority to the unit for transmitting redirected address.

The unit for transmitting redirected address of the receiving end is operable for sending the redirected address to the transmitting end via a communication port when receiving, from the redirection determination unit, a determination result indicating that the communication port needs to be redirected. The redirected address includes the redirected address information of the transport layer and the address information of the network layer of the receiving end itself, as well as the priority of the redirected address of the transport layer. Alternatively, the redirected address includes the redirected address information of the transport layer and the backup address information of the receiving end which is capable of managing the transmitting end and can be reached by a redirected port corresponding to the redirected address information of the transport layer, as well as the priority of the redirected address of the transport layer.

The transmitting end is operable for detecting the received information, and obtaining the redirected address of the transport layer. The transmitting end is able to communicate with a receiving end which can be reached via a redirected port corresponding to the redirected address of the transport layer. When the receiving end which can be reached via the redirected port is the original receiving end, the transmitting end continues to send signaling to the original receiving end via the redirected port. When the receiving end which can be reached via the redirected port is a new receiving end, the transmitting end sends signaling to the new receiving end via the redirected port. The implementation is similar to the related descriptions of method embodiment, which is omitted herein for brevity.

Figure 6:
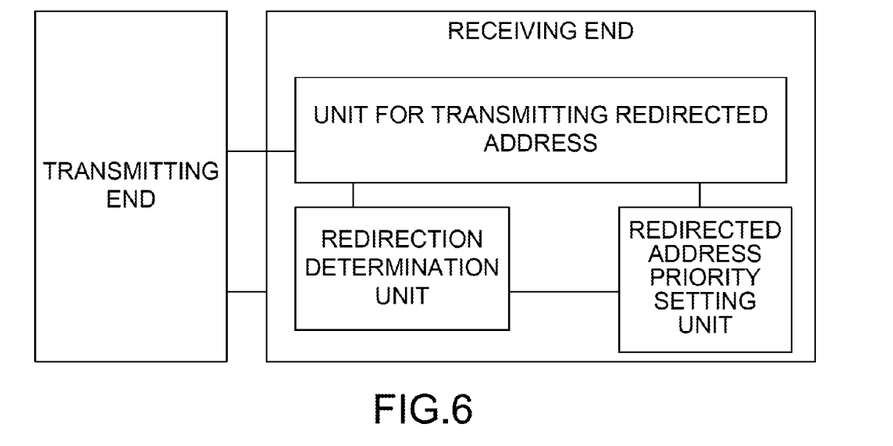
FIG. 6 illustrates a block diagram according to a fifth embodiment of the present invention.

A network communication system is also provided according to a fifth embodiment of the present invention. This system corresponds to the third embodiment. The structure of the system is illustrated in FIG. 6. The system includes a redirection determination unit and a unit for transmitting redirected address. Moreover, in order for the transmitting end to detect the redirected address as soon as possible, the receiving end may also include a redirected address priority setting unit.

The signal flow among each element in the system is described below.

The redirection determination unit of the receiving end is operable for detecting information (including information in the signaling and data) received by a port of the receiving end. When the redirection determination unit finds that the information is based on a particular protocol and finds that protocol switching needs to be performed based on a service policy, it is determined that the communication port needs to be redirected. The determination result is then sent to the unit for transmitting redirected address and the redirected address priority setting unit.

When the receiving end receives the determination result from the redirection determination unit indicating that the certain port needs to be redirected, the redirected address priority setting unit of the receiving end is operable for assigning a highest priority to the redirected address of the transport layer and sending the priority to the unit for transmitting redirected address.

The unit for transmitting redirected address is operable for sending the redirected address to the transmitting end via the certain communication port when receiving a determination result from the redirection determination unit indicating that the transmitting end needs to be redirected. The redirected address includes the redirected address information of the transport layer supporting the new protocol, e.g., a port number, and the address information of the network layer of the receiving end supporting the new protocol, wherein the receiving end can be reached via the redirected port corresponding to the address of the redirected port. The redirected address may also include a priority of the redirected address of the transport layer.

The transmitting end is operable for obtaining the redirected address, and switching to a new protocol when the redirected address of the transport layer supporting the new protocol is detected in the redirected address. The transmitting end further sends information to the address of the network layer of the receiving end, based on the new protocol, via a communication port corresponding to the address information of the transport layer of the redirected port. The implementation is similar to the related descriptions of method embodiment, which is omitted herein for brevity.

A receiving end is also provided according to a sixth embodiment of the present invention. The receiving end includes a redirection determination unit and a transmission unit. The redirection determination unit further includes a redirection determination sub-unit. The transmission unit further includes a sub-unit for transmitting redirected address. When there is more than one backup port, the receiving end may further include a redirected port determination unit. Moreover, in order for the transmitting end to detect the redirected address as soon as possible, the receiving end may further include a redirected address priority setting unit.

The redirection determination unit is operable for determining whether or not to redirect a particular communication port.

The redirection determination unit further includes a redirection determination sub-unit operable for detecting information received via a communication port and determining that the communication port needs to be redirected when certain information is found unreachable.

The redirected address determination unit is operable for determining one or more transport layer addresses and sending information to the transmitting end according to the transport layer addresses. After receiving an acknowledgement from the transmitting end, the redirected address determination unit may treat the transport layer address as the redirected address of the transport layer and provide the redirected address of the transport layer to the transmission unit. The detailed implementation is similar to the related descriptions of method embodiment, which is omitted herein for brevity.

The redirected address priority setting unit is operable for assigning priority to the redirected address before the receiving end sends the redirected address to the transmitting end, and sending the priority of the redirected address to the transmission unit. The detailed implementation is similar to the related descriptions of method embodiment, which is omitted herein for brevity.

The transmission unit is operable for sending the redirected address to the transmitting end via a port which is currently in communication with the transmitting end when the redirection determination unit determines that the particular communication port needs to be redirected. The redirected address includes redirected address information of the transport layer.

The transmission unit may further include a sub-unit for transmitting redirected address operable for sending the redirected address to the transmitting end via the communication port when the redirection determination sub-unit determines that the transmitting end needs to be redirected. The redirected address includes address information of the transport layer of the receiving end itself, and/or address information of the transport layer of the backup receiving end. The detailed implementation is similar to the related descriptions of method embodiment, which is omitted herein for brevity.

The sub-unit for transmitting redirected address may further be operable for send the address information of the network layer of a receiving end to the transmitting end via the particular communication port, wherein the receiving end can be reached via a redirected port corresponding to the redirected address information of the transport layer.

A receiving end is also provided according to a seventh embodiment of the present invention. The receiving end includes a redirection determination unit and a transmission unit. The redirection determination unit further includes a redirection determination sub-unit. The transmission unit further includes a sub-unit for transmitting redirected address. When there is more than one backup port, the receiving end may further include a redirected port determination unit. Moreover, in order for the transmitting end to detect the redirected address as soon as possible, the receiving end may further include a redirected address priority setting unit.

The redirection determination unit is operable for determining whether or not to redirect a particular communication port.

The redirection determination unit further includes a redirection determination sub-unit operable for detecting information received via a particular communication port and determining that the particular communication port needs to be redirected when the redirection determination sub-unit finds that the information is based on a certain protocol and needs to switch to another protocol based on a service policy.

The redirected address determination unit is operable for determining one or more transport layer addresses and sending information to the transmitting end according to the transport layer addresses. When receiving an acknowledgement from the transmitting end, the redirected address determination unit may treat the transport layer address as the redirected address of the transport layer and provide the redirected address of the transport layer to the transmission unit. The detailed implementation is similar to the related descriptions of method embodiment, which is omitted herein for brevity.

The redirected address priority setting unit is operable for assigning priority to the redirected address before the receiving end sends the redirected address to the transmitting end, and sending the priority of the redirected address to the transmission unit. The detailed implementation is similar to the related descriptions of method embodiment, which is omitted herein for brevity.

The transmission unit is operable for sending the redirected address to the transmitting end via a port which is currently in communication with the transmitting end when the redirection determination unit determines that the particular communication port needs to be redirected. The redirected address includes redirected address information of the transport layer.

The transmission unit may further include a sub-unit for transmitting redirected address operable for sending the redirected address to the transmitting end via the particular communication port when the redirection determination sub-unit is informed of the result that the redirected determination sub-unit determines that the particular communication port needs to be redirected. The redirected address includes redirected address information of the transport layer supporting the new protocol. The detailed implementation is similar to the related descriptions of method embodiment, which is omitted herein for brevity.

The sub-unit for transmitting redirected address may further be operable for sending the address information of the network layer of a receiving end to the transmitting end via the particular communication port, wherein the receiving end can be reached via a redirected port corresponding to the redirected address information of the transport layer supporting the new protocol. The detailed implementation is similar to the related descriptions of method embodiment, which is omitted herein for brevity.

A transmitting end is also provided according to an eighth embodiment of the present invention. The transmitting end includes:

a redirection unit operable for acquiring the redirected address sent from the receiving end, checking the redirected address and switching to a communication port corresponding to the address information of the transport layer after the redirection unit detects the address information of the transport layer for redirection.

an information transmission unit operable for communicating with a reachable receiving end via the communication port that the redirection unit switches to.

As can be seen from the implementation of the embodiment of the present invention, when the receiving end determines that the communication port needs to be redirected, the receiving end sends the redirected address to the transmitting end via a port which is currently in communication with the transmitting end. The redirected address includes redirected address information of the transport layer. According to various embodiments of the present invention, when the gatekeeper is not able to receive, via a well-known port, some of the signaling sent from a node, the gatekeeper is able to inform the transmitting end to perform an automatic port switching operation so that the node may continue the previous service via other unknown port. Accordingly, the problem that the node is not able to conduct communication normally as some of the signaling of the well-known port is filtered when passing through a firewall or other network security devices can be solved. Thus, manual configuration is no longer necessary and the problems of the security issue, heavy workload for maintenance, high cost incurred due to the manual configuration are eliminated. Moreover, embodiments of the present invention may also allow the node to perform an automatic protocol switching so that the node is able to communicate in a network with different protocol. In addition, the protocol switching is relatively flexible and has a high efficiency.

Apparently, various modifications and variations may be made by those skilled in the art without departing from the spirit and scope of the present invention. Accordingly, the present invention is intended to cover these modifications and variations if these modification and variation according to the present invention fall within the scope of the claims of the present invention and equivalent thereof.

What is claimed is:

1. A method for redirecting a network communication port, comprising:
   receiving, by a first receiving end, information from a transmitting end;
   detecting, by the first receiving end, a certain protocol that the information is based on;
   determining, by the first receiving end, on the basis of a service policy that a protocol switching operation is required;
   determining, by the first receiving end, that a communication port needs to be redirected; and
   sending, by the first receiving end, a redirected address to the transmitting end via a port which is currently in communication with the transmitting end, to make the transmitting end switch to a new protocol and send information to a second receiving end and make the transmitting end send information to the second receiving end corresponding to an address of a network layer supporting the new protocol via a communication port corresponding to address information of a transport layer based on the new protocol, wherein the redirected address comprises address information of the transport layer supporting the new protocol which is used for redirection.

2. The method of claim 1, wherein the redirected address further comprises address information of a network layer of the second a receiving end, the receiving end being reachable via the communication port corresponding to the address information of the transport layer.

3. The method of claim 2, wherein before sending the redirected address to the transmitting end, the method further comprises:
   determining one or more transport layer addresses and sending information to the transmitting end according to the transport layer addresses; and
   treating, after receiving an acknowledgement from the transmitting end, the transport layer address as the address of the transport layer which are used for redirection.

4. The method of claim 3, further comprises:
   setting priority for the redirected address before sending the redirected address to the transmitting end.

5. A receiving end, comprising:
   a redirection determination unit configured to:
     receive information from a transmitting end;
     detect the information received;
     detect a certain protocol that the received information is based on;
     determine to redirect a certain communication port based on the detected protocol when a service policy indicates the need to switch to a new protocol; and
   a transmission unit, configured to send a redirected address to the transmitting end via a port which is currently in communication with the transmitting end when the certain communication port needs to be redirected, to make the transmitting end switch to a new protocol and make the transmitting end send information to a second receiving end corresponding to an address of a network layer supporting the new protocol via a communication port corresponding to address information of a transport layer based on the new protocol, wherein the redirected address comprises address information of the transport layer supporting the new protocol for redirection.

6. The receiving end of claim 5, wherein,
the redirection determination unit comprises:
   a second redirection determination sub-unit, configured to detect information received via a certain communication port and determine that the certain communication port needs to be redirected when the second redirection determination sub-unit finds that the information is based on a certain protocol and needs to switch to another protocol based on a service policy;
the transmission unit comprises:
   a second sub-unit for transmitting redirected address, configured to send the redirected address to the transmitting end via the certain communication port when the second sub-unit for transmitting redirected address is informed of the result from the second redirected determination sub-unit that the certain communication port needs to be redirected, wherein the redirected address comprises address information of the transport layer supporting the new protocol which is used for redirection.

7. The receiving end of claim 6, wherein the second sub-unit for transmitting redirected address is further configured to send the address information of the network layer of another receiving end to the transmitting end via the particular communication port, wherein the receiving end is reachable via a communication port corresponding to the address information of the transport layer supporting the new protocol.

8. The receiving end of claim 5, further comprising:
   a redirected address determination unit, configured to determine one or more transport layer addresses and send information to the transmitting end according to the transport layer addresses; when the redirected address determination unit receives an acknowledgement from the transmitting end, the redirected address determination unit treats the transport layer address as the address of the transport layer for redirection and provides the transport layer address to the transmission unit.

9. The receiving end of claim 8, further comprising:
   a redirected address priority setting unit, configured to assign priority to the redirected address before the receiving end sends the redirected address to the transmitting end.

10. A transmitting end, comprising:
    a redirection unit, configured to acquire a redirected address sent from a receiving end, check the redirected address and switch to a new protocol and send information to a second receiving end and make the transmitting end send information to the second receiving end corresponding to an address of a network layer supporting the new protocol via a communication port corresponding to address information of a transport layer based on the new protocol, wherein the redirected address comprises address information of the transport layer supporting the new protocol; and
    an information transmission unit, configured to communicate with the second receiving end via the communication port that the redirection unit switches to.

11. A receiving end, comprising:
    a receiver, configured to receive, via a well-known port, signaling from a transmitting end;
    a processor, configured to monitor the signaling and determine whether or not to redirect the well-known port according to the received signaling;
    the processor, configured to determine that the well-known port is needed to be redirected when an error occurs on certain information of the transmitting end, or certain information cannot be reached;
    the processor, configured to obtain redirected address information of a transport layer;
    a transmitter, configured to send, via the well-known port, a signaling to the transmitting end wherein the signaling carries redirected address information of the transport layer, and make the transmitting end send information to a second receiving end corresponding to an address of a network layer supporting the new protocol via a communication port corresponding to address information of a transport layer based on the new protocol.

12. The receiving end of claim 11, wherein the receiving end is a gatekeeper.

* * * * *